Oct. 15, 1968  J. W. ERICKSON ET AL  3,405,661
ADJUSTABLE SECOND DECK FOR TRANSPORT VEHICLES
Filed July 26, 1966  3 Sheets-Sheet 1
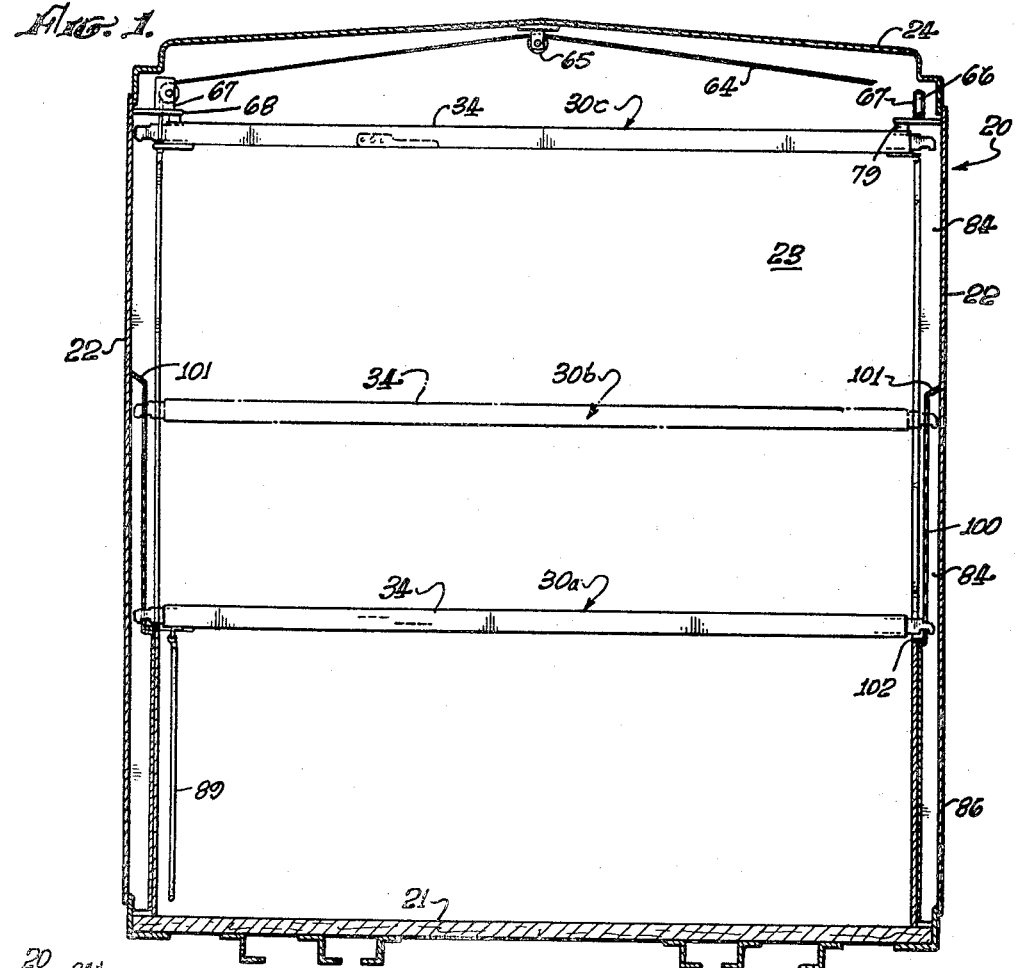
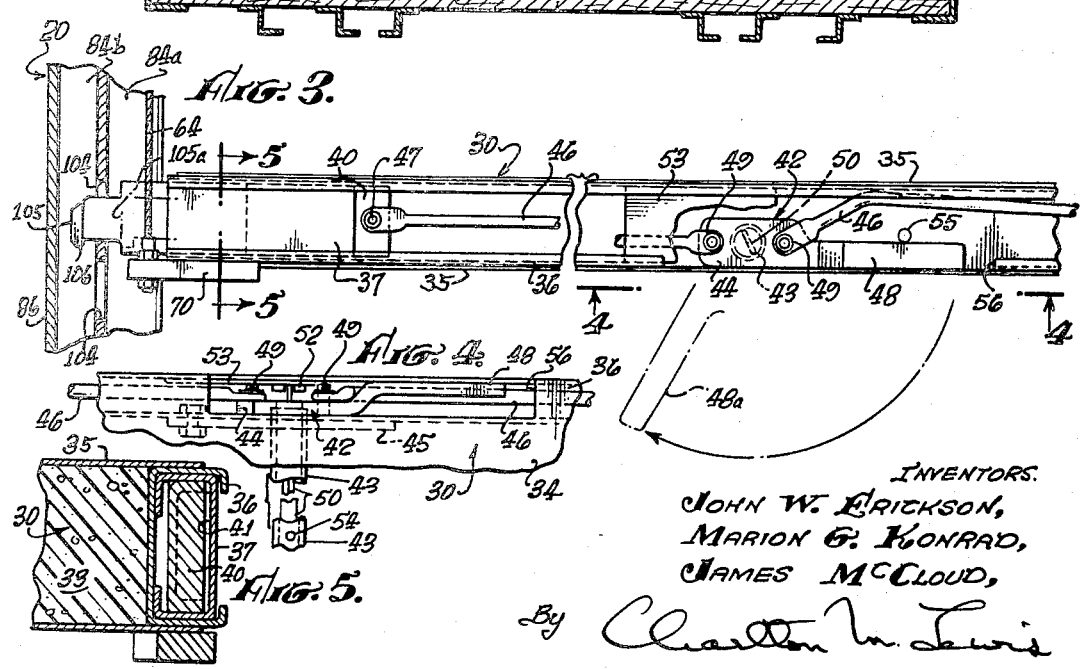
INVENTORS.
JOHN W. ERICKSON,
MARION G. KONRAD,
JAMES McCLOUD,
By Charlton M. Lewis Oct. 15, 1968　　　J. W. ERICKSON ET AL　　　3,405,661
ADJUSTABLE SECOND DECK FOR TRANSPORT VEHICLES
Filed July 26, 1966　　　3 Sheets-Sheet 2

INVENTORS.
JOHN W. ERICKSON,
MARION G. KONRAD,
JAMES McCLOUD,
By Charles M. Lewis

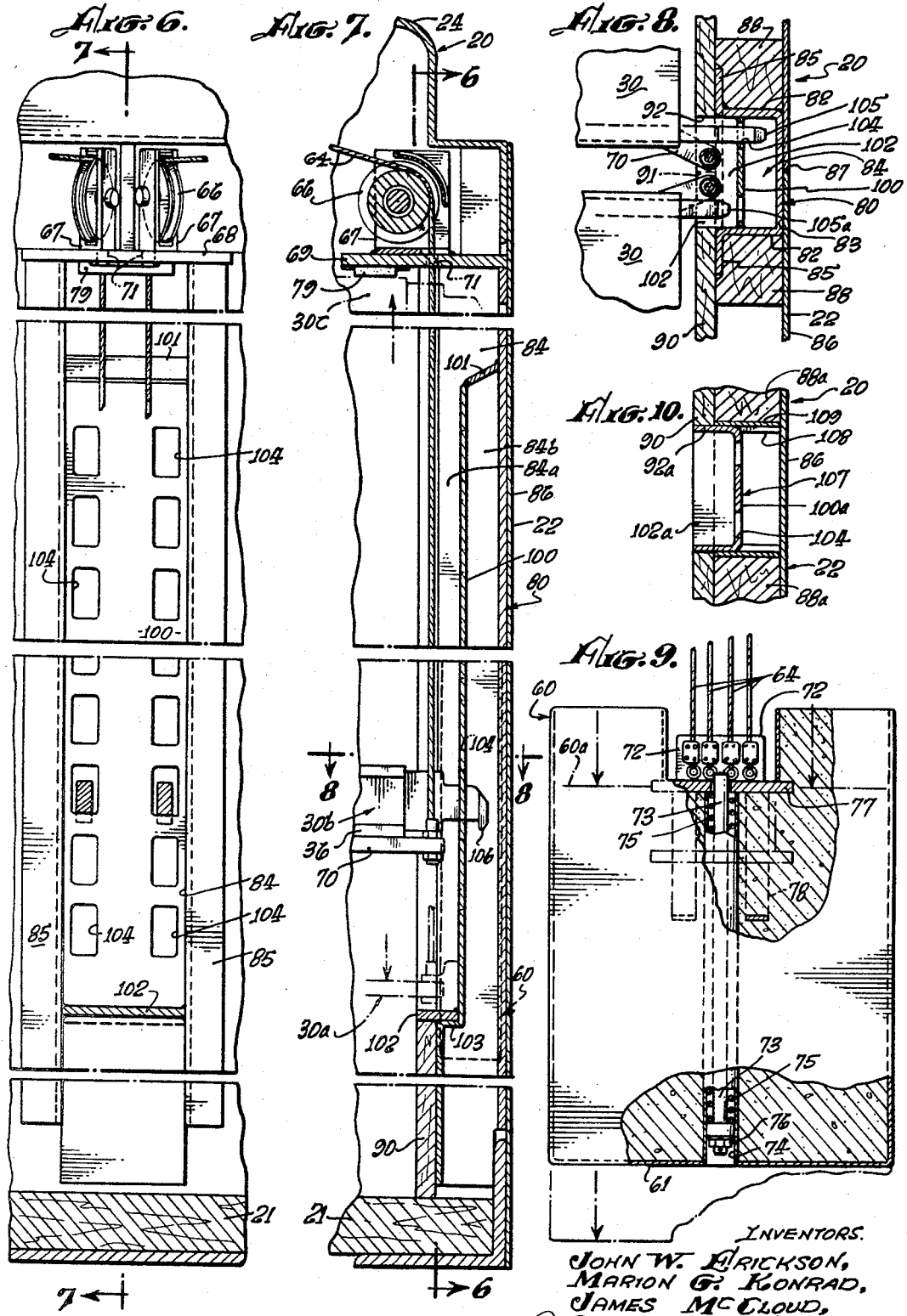

United States Patent Office 3,405,661
Patented Oct. 15, 1968

3,405,661
ADJUSTABLE SECOND DECK FOR TRANSPORT VEHICLES
John W. Erickson, Huntington Beach, Marion G. Konrad, Hacienda Heights, and James McCloud, Torrance, Calif., assignors to Preco Incorporated, Los Angeles, Calif., a corporation of California
Filed July 26, 1966, Ser. No. 567,972
13 Claims. (Cl. 105—371)

ABSTRACT OF THE DISCLOSURE

The present adjustable second deck structure for railway freight cars and the like comprises closely adjacent panels or deck sections each maintained level during vertical adjustment by cables that connect all four of its corners to a single counterweight that is slidably guided in a car wall. The cables are directly connected to a bracket, to which the counterweight is coupled by a spring, prestressed to stretch only in response to a force at least about 1.1 times the weight. That weight is less than the weight of a loaded panel, but exceeds that of the unloaded panel, facilitating storage of unused panels at the car ceiling. Locking pins are movably mounted on each panel and enter apertures formed at selected elevations in the car wall. Those apertures are preferably formed in longitudinal cross webs in vertical channel members which are typically part of the primary car structure. When in released position, the locking pins extend into the channels short of the webs and guide the vertical movement of the panels. The web is omitted above the highest desired panel working position. For safety a positive stop limits downward movement of the panel regardless of the pin position. The locking pins have downward projections at their ends, which hook to the web when the panel is loaded, preventing accidental release.

---

This invention has to do with load carrying vehicles and relates more particularly to the provision of a second deck or floor that is vertically adjustable with respect to the regular floor of the lading compartment of the vehicle.

Most previous second deck structures for railway freight cars have been designed for handling livestock and have involved a unitary deck filling the entire area of the car. Such structures are necessarily heavy and cumbersome to operate and add excessively to the weight of the vehicle.

The present invention provides a plurality of deck sections which are closely adjacent each other and are capable of forming an effectively continuous deck that fills essentially the entire car. However, those sections are independently operable, and may be shifted individually between stored and operating positions at selected heights. Such an installation is relatively light in weight and extremely flexible in the variety of configurations that can be arranged to conform to the special requirements of individual loads. An important object of the present invention is to permit convenient and rapid manipulation of the individual deck sections by a single operator.

One aspect of the present invention provides a particularly effective way of maintaining a section of such an adjustable second deck strictly parallel to the vehicle floor during its adjustment from one level to another. That control of the orientation of the deck section is accomplished by joining all four corners of the deck via flexible cables to a common counterweight which is vertically movable in guided relation to one of the vehicle walls. The counterweight thus performs the dual function of balancing part or all of the weight of the deck section and also limiting the deck movement to vertical translation parallel to itself.

Another aspect of the invention provides economical and effective structure for guiding the vertical movement of a deck section with relation to the vehicle walls and for releasably locking the deck section at a desired working level. That locking mechanism is amply strong to support a normal load on the deck section and also to withstand the relatively large vertical forces that may result from intermittent acceleration of the vehicle body. At the same time the locking mechanism is shiftable readily between a condition of secure and reliable locking and a condition in which the deck section is freely movable vertically between its one or more available working positions and a stored position, typically adjacent the car ceiling.

In preferred form of the invention the locking mechanism utilizes locking pins that are mounted adjacent the respective corners of the deck section and are projectable simultaneously under control of a single handle. The pin ends, even in retracted position, are received in channels of vertical structural members set into the car wall, thus serving to guide the vertical movement of the deck sections. In addition, those same pins in their projected locking positions enter apertures formed in the channel walls. The locking mechanism is thus recessed in the car wall where it is entirely out of the way and protected from possible damage, both when the second deck is in use and when it is stored in idle position.

The locking pins are preferably operated in unison by a control shaft to which they are linked by a crank mechanism, the control shaft being continuously spring biased toward locking position.

A further feature of the invention greatly facilitates movement of the deck sections between working and stored positions. For that purpose the counterweight is made appreciably heavier than the deck section to which it is connected. Release of the locking mechanism then lifts the deck to its stored position adjacent the car ceiling, in which position it is reliably retained by the counterweight without requiring operation of any special locking mechanism.

In accordance with a further aspect of the invention, the regular side posts, which normally form the principal structural members of the car wall, are constructed with a cross section that provides a suitable channel opening toward the interior of the car. Those channels are then utilized by the second deck installation for guiding and locking the deck sections.

A full understanding of the invention and of its further objects and advantages will be had from the following illustrative description of a preferred embodiment by which it may be carried out. The particulars of that description, and of the accompanying drawings which form a part of it, are intended only as illustration and not as a limitation upon the scope of the invention.

In the drawings:

FIG. 1 is a transverse vertical section representing somewhat schematically a railway car embodying the invention in illustrative form;

FIG. 3 is fragmentary section corresponding generally to a portion of FIG. 1 at enlarged scale;

FIG. 4 is a fragmentary view in the aspect indicated by the line 4—4 of FIG. 3;

FIG. 5 is a fragmentary section on the line 5—5 of FIG. 3;

FIG. 6 is a fragmentary section in the aspect indicated by the line 6—6 of FIG. 7;

FIG. 7 is a section on the line 7—7 of FIG. 6;

FIG. 8 is a section on the line 8—8 of FIG. 7;

FIG. 9 is an elevation, partly in section and at enlarged scale, representing a counterweight in accordance with the invention; and FIG. 10 is a section corresponding to a portion of FIG. 8 and representing a modification.

Figure 2:
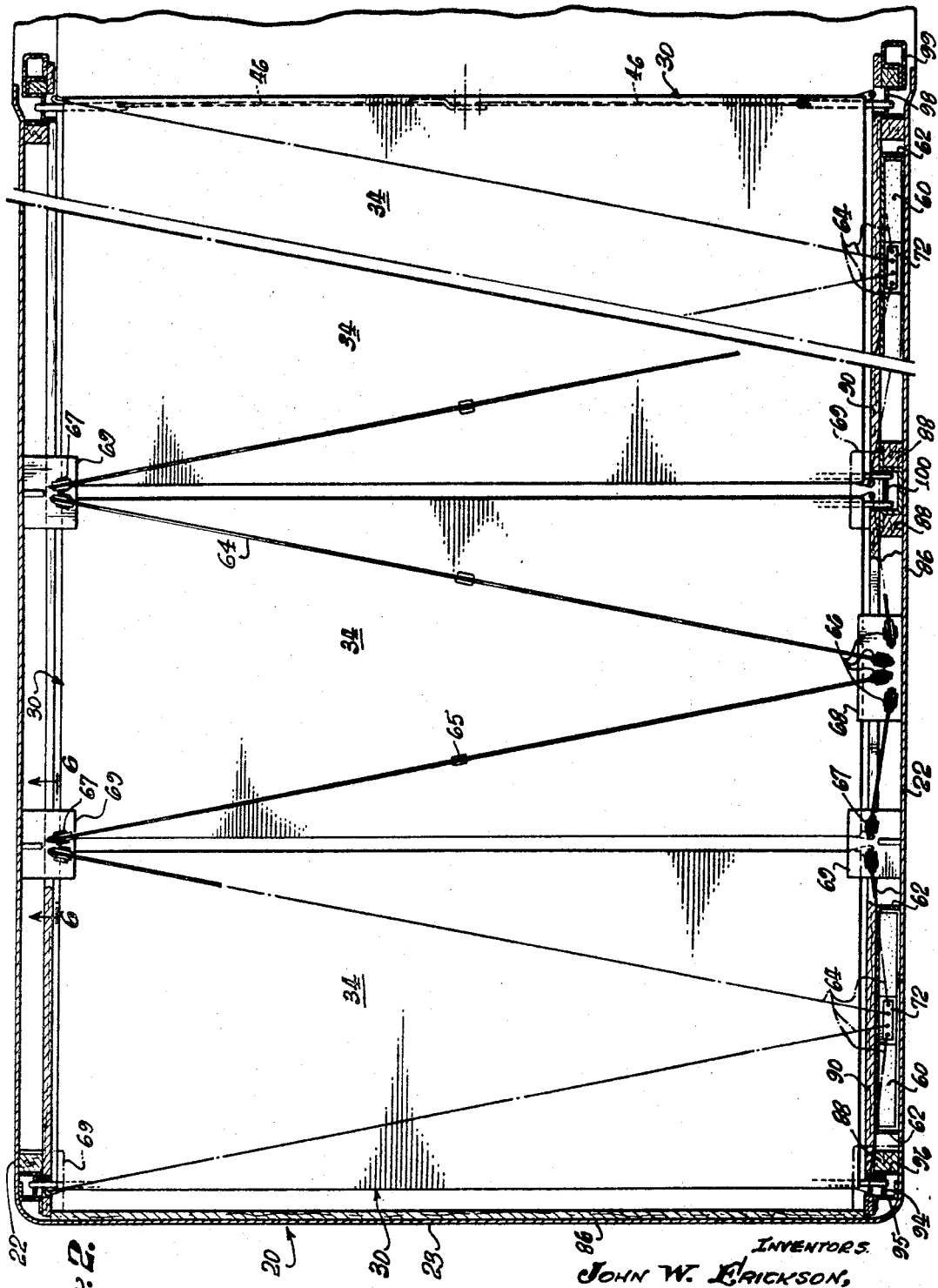
FIG. 2 is a fragmentary horizontal section of the embodiment of FIG. 1.

In the illustrative embodiment of the invention shown in FIGS. 1 to 10, a railway boxcar is indicated at 20 with floor 21, side walls 22, end wall 23 and ceiling 24. A series of mutually adjacent horizontal deck sections 30 are mounted in the car for independent vertical translational movement between a stored position adjacent the car ceiling, as represented by deck section 30c, in FIG. 1, and a variety of selectable working positions spaced between floor 21 and ceiling 24, as represented by deck sections 30a and 30b. Each deck section comprises a rectangular panel structure 34, the ends of which are closely spaced from side walls 22. The side edges of the panel are reenforced by channel members 36, and other structural elements may be provided in the panel as required. A flat facing 35 of sheet iron or the like is preferably provided on the top and bottom faces of each panel and the interior may be filled with a strengthening core 33 of foamed plastic such, for example, as rigid urethane foam. The end portions of channel members 36 are preferably reenforced by insertion of smaller channel sections 37 in reversed relation, thus forming fully enclosed guide passages 41 of rectangular section as shown best in FIG. 5.

Locking pins 40 are slidingly received in those passages, extending outwardly beyond the panel ends and preferably extending inwardly beyond the reenforcing members 37. The sliding movement of pins 40 in passages 41 is controlled by the crank assembly 42, which comprises the control shaft 43 and the two dual crank arms 44 fixedly mounted at the shaft ends. Shaft 43 extends the full width of the panel and is journaled on brackets 45 which may be welded to the flanges of channels 36 at any selected point intermediate their length. Locking pins 40 are connected to the respective crank arms 44 by the links 46, pivotally mounted at 47 and 49. One or both of the dual crank arms 44 carries an extension 48 which serves as an operating handle for controlling the shaft position and hence the locking pin movement.

In preferred form of the invention shaft 43 is tubular and contains a torsion spring 50. That spring extends typically the full shaft length, projecting at one end through a clearance aperture in crank 44 and engaging a defining fixture 52, fixedly mounted within channel 36 by means of the bracket plate 53. The other end of spring 50 is rotatively fixed to the tubular shaft in any suitable manner, as by a transverse bolt 54 which also defines the axial position of the spring. Spring 50 is preloaded in a manner to continuously urge shaft rotation toward the position shown in FIG. 3, in which the locking pins are all projected to their outer positions. In that shaft position control handle 48 is preferably recessed within channel 36, against a stop 55, the channel flange being cut way at 56 for that purpose. The locking pins are withdrawn inwardly by rotation of handle 48 downward against the force of spring 50 to a releasing position indicated at 48a. Upon release of the handle, spring 50 automatically returns it to locked position.

Each deck section is provided with a counterweight 60 which moves vertically within a guide channel formed in the car wall, as by the two opposed guide members 62. The counterweight typically comprises a metal container 61 of flat section filled with concrete or similar material. Each counterweight is connected directly to all four of the corners of the associated deck section by the cables indicated at 64. Those cables pass over freely rotatable pulleys 66 which are journaled in suitable positions near the car ceiling, as indicated clearly in FIGS. 1 and 2. Each pulley is typically journaled on an individual bracket structure 67, all of which may be of identical design. Those brackets are assembled in correct position and secured, as by welding, on horizontal mounting plates 68 and 69, which are fixedly installed in the car directly above the counterweight guideway 62 and above the respective corners of the deck sections, respectively. Clearance holes 71 for the cables are provided at suitable points in places 68 and 69 for the cables. Guide pulleys 65 keep cables 64 close to the car roof where they cross the car.

Each cable 64 is typically connected to the deck section by means of a bracket 70 which extends from the corner area of the panel into a channel member recessed in the wall, as will be more fully described. The four cables for each deck section are connected to the same counterweight, preferably by means of a common bracket structure which permits limited longitudinal movement of the weight relative to all four cables in response to excessive loads, as indicated at 60a in FIG. 9. As shown, that bracket structure comprises the head portion 72, to which the cable ends are clamped, and the shank portion 73. That shank projects downwardly through a vertical bore 74 in counterweight 60. The helical compression spring 75 surrounds shank 73 within bore 74. It is adjustably coupled to the shank at its lower end by the nut 76 and engages at its upper end the transverse top plate 77, fixed to the counterweight. The ends of top plate 77 are typically imbedded in the body of the counterweight, with additional reinforcing members 78 as needed. The relative lengths of the cables 64 are typically adjusted at the time of installation to maintain each deck section accurately parallel to the car floor. That adjustment may be made with the deck section at any convenient level, and the cables will then act inherently to maintain accurate parallelism at all levels.

Spring 75 is preloaded sufficiently to maintain bracket head 72 in firm contact with plate 77 during all normal operation, but to permit upward movement of the bracket relative to the counterweight whenever abnormal vertical acceleration might otherwise apply excessive force to the cables. For that purpose the preloading of spring 75 is preferably at least about 10% greater than the weight of the counterweight. Bracket head 72 then remains in contact with the counterweight unless the total vertical acceleration loading exceeds about 1.1 times the acceleration of gravity. The upper limit of spring preloading is not particularly critical, especially if cables 64 are of generous proportions, as is preferably the case. For deck sections weighing of the order of 300 pounds and having an area of the order of 40 square feet, cables 64 are typically of 7 x 19 wire rope 3/16 inch in diameter, for example.

The weight of counterweight 60 is preferably selected to exceed the total weight of the deck section to which it is connected. That excess is sufficient to insure that upon release of locking pins 40 the deck section, if unloaded, will be lifted by the counterweight to the upper end of its movement range and held there without requiring any specific locking mechanism. The stored position is preferably defined by bumpers 79 of rubber or similar material mounted on the underside of plates 68 and 69 at the four corners of each section. A deck section is readily retrieved from stored position by simply pulling the pulldown rope 89 which hangs from one of the front corners of the panel (FIG. 1). At the same time it is preferred that the counterweight be decidedly lighter than the total weight of the deck section plus any normal load that it may carry. Since the load on a single deck section is typical of the order of 7,000 pounds, that condition is readily met. It has been found in practice that satisfactory operation is normally obtained if the counterweight weighs from about 10 to about 20% more than the total weight of an unloaded panel.

The vertical movement of deck sections 30 is guided by channels formed in the side walls 22 of the car. For that purpose, in accordance with one aspect of the present invention, the conventional boxcar construction is modified by replacing at least some of the Z frames which usually serve as sideposts in the car walls by sideposts of general channel section, typically as shown best in FIG. 8. Channel 80 comprises web portions 82 joined by the flat channel bottom 83 and defining a channel chamber 84 which opens inwardly to the interior of the car. The free ends of webs 82 are bent outwardly to form flanges 85, producing a "hat section." Channel bottom 83 provides an effective splice piece for joining adjacent sheets of the car outer skin 86, which butt together at 87. Wooden nailers 88 are preferably installed at each side of sideposts 80, reenforcing outer skin 86 and providing convenient attachment for the plywood inner liner 90. That liner is preferably installed in sections with joints 91 on the center line of the respective sideposts. However, the edges of the liner sections are cut back at 92 throughout the upper portion of the sidepost length, exposing the full width of channel chamber 84. The width of channel 84 in the direction parallel to the car wall is sufficient to receive the lock pins 40 of two adjacent deck sections.

A lock plate 100 is fixedly mounted in the channel, extending parallel to channel bottom 83 and spaced therefrom by a distance which is typically from ½ to ⅔ of the channel depth, dividing channel 84 into a front open portion 84a and an inner closed portion 84b. The lock plate need not extend the full length of the sideposts, but may be confined to a portion of that length which essentially corresponds to the desired range of working positions of the deck sections. That working range typically occupies approximately the center ⅓ of the total height of the car lading compartment, and its lower end is preferably spaced at least about three feet above the car floor. The lower end of the working range is preferably defined by suitable stop structure for positively preventing further downward movement of the deck sections. In the present embodiment that stop structure comprises the stop plate 102 which extends transversely across the whole width of channel 84a in front of the lock plate at an offset 103 of the latter. Below that point the lock plate is alined with channel flanges 85. At its upper end, lock plate 100 terminates in an oblique section 101 which closes off the inner chamber 84b formed between channel bottom 83 and the lock plate. In the retracted positions of lock pins 40 their ends 105 clear lock plate 100 but enter the front channel portion 84a sufficiently to effectively guide the movement of the deck sections. The lock plate carries two vertical rows of locking apertures 104 which receive the ends of the lock pins 40 when they are projected into locking position. Apertures 104 may be provided at any heights from the car floor at which it is desired to make a second deck available. An illustrative arrangement provides such locking apertures at three-inch intervals throughout the working range of the deck.

The locking formations for engagement by pins 40 at the corners of each installation, that is, at the corners of the car and at the doorposts, can employ car post structures of special section similar to posts 80. However, it is usually more convenient at those positions, at each of which there is only one locking pin, to employ conventional design for the basic car structure and insert suitable vertical members of channel or angle section with locking apertures corresponding to those of posts 80. Such an angle member 94 is shown in FIG. 2, welded to the conventional corner post 95 along one side and to a stiffening plate 96 on the other side. Locking apertures are provided in the angle flange parallel to the car wall. A similar apertured angle member 98 is set into the car wall next to the conventional door post 99.

Some or all of the dual pin locking formations can similarly comprise members of suitable section added to the normal car structure, for example as indicated in FIG. 10. In that illustrative structure the lockplate 100a comprises the web portion of a channel member 107 that is set in the wall with stiffening members 109 and with wooden nailers 88a if desired. The channel opens toward the car interior, at least throughout the range of vertical adjustment of the deck sections, that range being defined at its lower end by a positive stop plate 102a similar to 102 of FIGS. 7 and 8. Below the working range of the deck sections, the flanges of channel 107 may be reversed in direction, as indicated at 108 in FIG. 10.

The outer ends 105 of lock pins 40 are provided with downwardly extending hook formations 106, adapted to oppose the inner face of lock plate 100 when the pins are projected. With a normal load on the deck section, the deck is supported primarily by the contact of its four lock pins with the lower edges of their respective locking apertures 104. Hooks 106 then positively prevent the pins from being retracted, either by operation of handle 48 or by abnormal lateral accelerations of the entire car body. On the other hand, when the deck section is unloaded, counterweight 60 lifts the hooks 106 free of apertures 104, automatically permitting free retraction of the locking pins to release the deck section.

In preferred form of the invention, cables 64 are attached to the respective deck sections in such a way that the vertical runs of the cables are recessed within the front portions 84a of the channel chambers 84 of the sideposts. That is typically accomplished by suitable placement of the cable brackets 70, which extend obliquely from the corners of the deck panels and locate the cables outside of locking pins 40 and close to their ends when retracted, as shown at 105a in FIGS. 3 and 8. The vertical cable runs then cannot interfere with loads carried by the deck, and are protected from possible damage.

When the deck sections are all locked in working position at a common level they typically form an essentially continuous lading deck extending from car end wall 23 approximately to the doors in the car side walls. For that purpose five deck sections with an effective width of about four feet each are typically required in each end of the car. However, it is often useful to employ only one or a few adjacent deck sections. Also, individual sections may be employed at different heights to accommodate the special requirements of any particular load.

Suitable fittings, not explicitly shown, may be provided in the car wall for securing strappings of any desired type for holding freight on the respective deck sections. Such fittings may be of conventional design and are preferably provided at a variety of levels within the range of adjustment of the panels, and adjacent the doorside edge of each deck section.

We claim:

1. A second deck assembly for a freight carrying vehicle having a floor, two parallel opposed side walls and a ceiling, said second deck assembly comprising in combination
   a rectangular deck section extending substantially the entire vehicle width btween the side walls and adapted to support a load,
   a bracket element,
   a counterweight spring-suspended from the bracket element and vertically movable in guided relation to a vehicle wall,
   freely rotatable pulleys mounted adjacent the vehicle ceiling above the counterweight and above the respective corners of the deck section,
   cables directly interconnecting the respective corners of the deck section and the bracket element, the cables being guided by respective pulleys to permit free vertical complementary translational movement of the deck section and the counterweight, the lengths of the respective cables being so related that the deck section is maintained parallel to the vehicle floor during said movement,
   and locking means mounted on the deck section and on the vehicle walls and releasably interengageable to positively lock the deck section at a selected level above the vehicle floor.

2. A second deck assembly as defined in claim 1, and wherein
   said spring suspension for the counterweight comprises spring means interconnecting the counterweight and bracket element and deflectable in response to downward movement of the counterweight relative to the bracket element, and stop means limiting upward movement of the counterweight relative to the bracket element to maintain the spring means preloaded with a force corresponding to at least about 1.1 times the weight of the counterweight.

3. A second deck assembly as defined in claim 1, and wherein said locking means comprise locking elements mounted on the deck section adjacent the respective corners thereof for movement between locking and releasing positions, a plurality of sets of locking formations fixedly mounted on the vehicle side walls at respective different levels above the vehicle floor in position to be engaged by the locking elements in locking position thereof, means yieldably urging the locking elements toward their said locking positions, and means manually actuable to positively shift all the locking elements simultaneously to releasing positions out of engagement with the locking formations.

4. A second deck assembly as defined in claim 3, and wherein the weight of said counterweight exceeds the weight of the unloaded deck section, release of said locking means tending to return the unloaded deck section to a stored position adjacent the vehicle ceiling, and said locking formations are limited to a vertically intermediate portion of the side walls, the deck section being freely movable vertically between said stored position and the upper end of said intermediate portion independently of the position of the locking elements.

5. A second deck assembly for a freight carrying vehicle having a floor and two parallel opposed side walls, said second deck assembly comprising in combination a rectangular deck section extending substantially the entire vehicle width between the side walls and adapted to support a load, a counterweight vertically movable in guided relation to a vehicle wall, the weight of the counterweight exceeding the weight of the unloaded deck section by an amount less than the weight of any normal load, cable and pulley means interconnecting all the corners of the deck section and the counterweight to maintain the deck section horizontal while permitting free complementary translational movement of the deck section and the counterweight, locking elements mounted on the deck section for generally horizontal movement between locking and releasing positions, and locking formations fixedly mounted on the side walls in position to be engaged by the respective locking elements in locking positions thereof to positively lock the deck section at a selected level above the vehicle floor.

the locking elements having downwardly extending projections adapted to interlock with the locking formations by virtue of downward movement of the loaded deck section in response to a normal load and thereby to prevent movement of the locking elements to their releasing positions, upward movement of the unloaded deck section in response to the counterweight acting to disengage the locking element projections, permitting movement of the locking elements to their releasing positions.

6. A second deck assembly for a freight carrying vehicle having a floor, two parallel opposed side walls and a ceiling, said second deck assembly comprising in combination a rectangular deck section extending substantially the entire vehicle width between the side walls and adapted to support a load, a counterweight vertically movable in guided relation to a vehicle wall, freely rotatable pulleys mounted adjacent the vehicle ceiling above the counterweight and above the respective corners of the deck section, cables interconnecting the respective corners of the deck section and the counterweight, the cables being guided by respective pulleys to permit free vertical complementary translational movement of the deck section and the counterweight, the lengths of the respective cables being so related that the deck section is maintained parallel to the vehicle floor during said movement, vertical members of general channel section fixedly set in the vehicle side walls with the channels opening to the interior of the vehicle adjacent the respective corners of the deck section, the walls of the respective channels being apertured at a plurality of correspondingly vertically spaced positions, locking elements mounted on the deck section adjacent the respective corners thereof and shiftable between releasing positions disengaged from said apertures and locking positions projecting into those apertures to positively lock the deck section against vertical movement from a selected level above the vehicle floor, the locking elements in said releasing positions extending into the channels and thereby guiding the vertical movement of the deck section.

7. A second deck assembly as defined in claim 6, and wherein said channel members have apertured lower portions and unapertured upper portions, the unapertured channel portions being enlarged relative to the apertured portions, whereby the unapertured channel portions freely receive the locking elements in both locking and releasing positions thereof.

8. A second deck assembly as defined in claim 7, and wherein said channel members comprise primary structural members of the vehicle side walls, said structural members being formed initially with a uniform channel depth throughout said upper and lower portions, and a web plate fixedly mounted in each channel below said unapertured portion thereof and effectively reducing the depth of the channel, said channel wall apertures being formed in the web plate.

9. A second deck assembly as defined in claim 6, and including also transverse stop plates fixedly mounted on the respective channel members and extending across the mouths of the channels below the apertured portions thereof and at a common distance of at least about three feet above the vehicle floor, in position to engage the respective locking elements in both locking and releasing positions thereof in response to downward movement of the deck section and thereby to positively limit such movement.

10. The combination defined in claim 6, and including also resilient means continuously urging the locking elements toward their projected positions, and means mounted on each panel member and manually actuable to positively and simultaneously retract all of the locking elements of that panel member.

11. A second deck assembly as defined in claim 6, and including web plates fixedly mounted in the respective channels in spaced parallel relation to the channel bottoms, said channel apertures being formed in the web plates.

12. In combination, a railway box car having side posts of general channel section with channels opening toward the interior of the car, the channels having flat bottom portions that act as splice pieces for the outer skin sections of the car, and the car inner liner sections having their edges supported by the channel flanges and leaving open at least the upper portions of the channels, a plurality of horizontal rectangular panel members adapted to support loads and mounted in the car extending substantially the entire car width and closely spaced longitudinally of the car, the corner portions of each panel member being adjacent the channel mouths of respective side posts, means supporting the respective panel members for independent vertical translational movement and comprising a counterweight for each panel member vertically movable in guided relation to a car side wall, and cable and pulley means interconnecting all the corners of each panel member and its counterweight to maintain the panel horizontal during its vertical translational movement, the weight of each counterweight exceeding the weight of its unloaded panel member, whereby release of said locking means tends to return the unloaded panel member to a stored position adjacent the roof of the car, web plates fixedly mounted in the respective channels in spaced parallel relation to the channel bottoms and having longitudinally spaced apertures, locking elements mounted on the panel members adjacent the corners thereof in positions to project into the adjacent channel mouths to guide said vertical movement of the panel members, the locking elements being projectable to a locking position extending through respective web plate apertures and spaced from the channel bottom to releasably lock each of the panel members independently at a selected one of a plurality of vertically spaced positions, the locking elements being retractable to a releasing position spaced clear of the web plates, and said web plates terminating at their upper ends at a level spaced below said stored positions of the panel members, the panel member being freely movable within the range between said level and said stored positions.

13. The combination defined in claim 12, and wherein the locking elements at adjacent corners of each pair of adjacent panel members are received in a common channel.

References Cited

UNITED STATES PATENTS

| | | | |
|---|---|---|---|
| 2,316,554 | 4/1943 | Bryan | 105—370 |
| 2,336,440 | 12/1943 | Kass | 105—370 |
| 2,586,857 | 2/1952 | Page | 105—371 |
| 2,825,600 | 3/1958 | Macomber | 296—24 |
| 3,119,350 | 1/1964 | Bellingher | 105—370 X |
| 3,352,595 | 11/1967 | Bezlat | 296—24 |

DRAYTON E. HOFFMAN, *Primary Examiner.*